United States Patent [19]

Beyers, Jr. et al.

[11] Patent Number: 6,081,300
[45] Date of Patent: Jun. 27, 2000

[54] APPARATUS AND METHOD FOR GENERATING ON-SCREEN-DISPLAY MESSAGES USING STORED BITSTREAMS

[75] Inventors: Billy Wesley Beyers, Jr., Greenfield, Ind.; Wai-Man Lam, Mohegan Lake, N.Y.

[73] Assignee: Thomson Consumer Electronics, Inc., Indianapolis, Ind.

[21] Appl. No.: 08/973,035

[22] PCT Filed: May 17, 1996

[86] PCT No.: PCT/US96/07127

§ 371 Date: Nov. 24, 1997

§ 102(e) Date: Nov. 24, 1997

[87] PCT Pub. No.: WO96/38007

PCT Pub. Date: Nov. 28, 1996

[30] Foreign Application Priority Data

May 24, 1995 [GB] United Kingdom .................. 9510484

[51] Int. Cl.$^7$ ....................................... H04N 9/74
[52] U.S. Cl. ..................... 348/589; 345/472; 345/141; 348/600
[58] Field of Search ..................... 348/420, 465, 348/478, 569, 589, 600; 345/141, 439, 472

[56] References Cited

U.S. PATENT DOCUMENTS

| | | | |
|---|---|---|---|
| 3,911,420 | 10/1975 | Lampson | 340/324 |
| 4,091,424 | 5/1978 | Widergren | 358/260 |
| 5,122,875 | 6/1992 | Raychaudhuri et al. | 358/133 |
| 5,579,030 | 11/1996 | Karow | 345/143 |

FOREIGN PATENT DOCUMENTS

| | | |
|---|---|---|
| 2-304596 | 12/1990 | Japan. |
| 3-257590 | 11/1991 | Japan. |
| 7-044539 | 2/1995 | Japan. |
| 7-075081 | 3/1995 | Japan. |
| 83/01696 | 5/1983 | WIPO. |
| 95/06391 | 3/1995 | WIPO. |
| 96/19077 | 6/1996 | WIPO. |

OTHER PUBLICATIONS

4th International Online Information Meeting, London, Dec. 1980, pp. 67–77.

GLOBECOM '92, vol. 1/3, Dec. 6, 1992, Shae et al. "Mixing and Playback of JPEG Compressed Packet Videos", pp. 245–249.

*Primary Examiner*—Bryan Tung
*Attorney, Agent, or Firm*—Joseph S. Tripoli; Peter M. Emanuel; Paul P. Kiel

[57] ABSTRACT

An apparatus and concomitant method for constructing a valid OSD message bitstream from a plurality of stored character bitstreams. Each character of the OSD font set is initially scaled into a fixed block size, e.g., a block size of 16×16 pixels. Each character is then encoded into a "character bitstream" using the intra macroblock coding syntax. The character bitstream is stored within a storage medium. When a frame of OSD messages needs to be encoded, the character bitstreams are read from the storage medium and cascaded to form a valid OSD message bitstream which represents the frame of OSD messages.

16 Claims, 3 Drawing Sheets

APPARATUS AND METHOD FOR GENERATING ON-SCREEN-DISPLAY MESSAGES USING STORED BITSTREAMS

FIELD OF THE INVENTION

The present invention relates to a method and apparatus for generating On-Screen-Display (OSD) messages using stored bitstreams. More particularly, this invention relates to a method and apparatus that extracts and concatenates a plurality of stored "character bitstreams" to construct a valid OSD message bitstream that represents a screen of OSD messages.

BACKGROUND OF THE INVENTION

On-Screen-Display messages play an important role in consumer electronics products by providing users with interactive information so as to guide them through the usage and configuration of the product. The increasing development of digital video technology presents an ever increasing problem of generating OSD messages which are compatible with the various commercially available digital video decoders. These decoders are generally designed to decode bitstreams with a specific format such as the ISO/IEC international Standards 11172 (1991) (generally referred to as MPEG-1 format) and 13818 (1995) (generally referred to as MPEG-2 format).

Although the MPEG standards specify a general coding methodology and syntax for generating a MPEG compliant bitstream, many variations are permitted, thereby supporting a broad range of applications such as desktop video publishing, video conferencing, digital storage media and television broadcast.

In effect, MPEG does not define a specific algorithm needed to produce a valid bitstream. Thus, MPEG encoder designers are accorded great flexibility in developing and implementing their own MPEG-specific algorithms.

This flexibility fosters development and implementation of various MPEG-specific algorithms. However, a common goal of MPEG encoder designers is to design a MPEG-specific algorithm that operates within a prescribed bit rate and operating delay constraint. As such, before an image is encoded, a MPEG-specific algorithm must execute a complex process of balancing numerous factors such as coding mode decisions, picture type, rate control, coarseness of the quantization scale, motion estimation, scalability, detection of distortion, effect of scene cuts and the nature of the signal within the macroblock. Without knowing in advance as to the nature of the images that are to be encoded, an encoder must spend many computational cycles to determine the optimal values for various parameters to properly encode an image.

In the field of OSD message generation, a frame of OSD messages is generally encoded in the same manner as other images without special treatment. However, unlike other images, OSD messages contain repetitively used components, i.e., the basic set of font characters (letters, numbers and other special characters). This prior knowledge of the nature of the input images can be used to improve the efficiency of the encoding method for a frame of OSD messages. Thus, a need exists for a method and apparatus for generating a valid bitstream of a frame of OSD messages by exploiting the repetitive nature of OSD messages.

SUMMARY OF THE INVENTION

The invention concerns an apparatus and concomitant method for constructing a valid OSD message bitstream from a plurality of stored character bitstreams.

More specifically, in accordance with the invention, each character of the OSD font set is initially scaled into a fixed block size, e.g., a block size of 16×16 pixels. Thus, each OSD character is enclosed within a block size that is smaller than or equal to the size of a macroblock used by a MPEG-specific encoder. Each character is then encoded into a MPEG-compliant bitstream using the intra macroblock coding syntax. The "character bitstream" which represents each character is stored within a storage medium. When a frame of OSD messages needs to be encoded, the character bitstreams are read from the storage medium and cascaded to form a valid MPEG bitstream which represents the frame of OSD messages.

These and other aspects of the invention will be described with respect to the accompanying drawings.

DETAILED DESCRIPTION OF THE DRAWING

Figure 1:
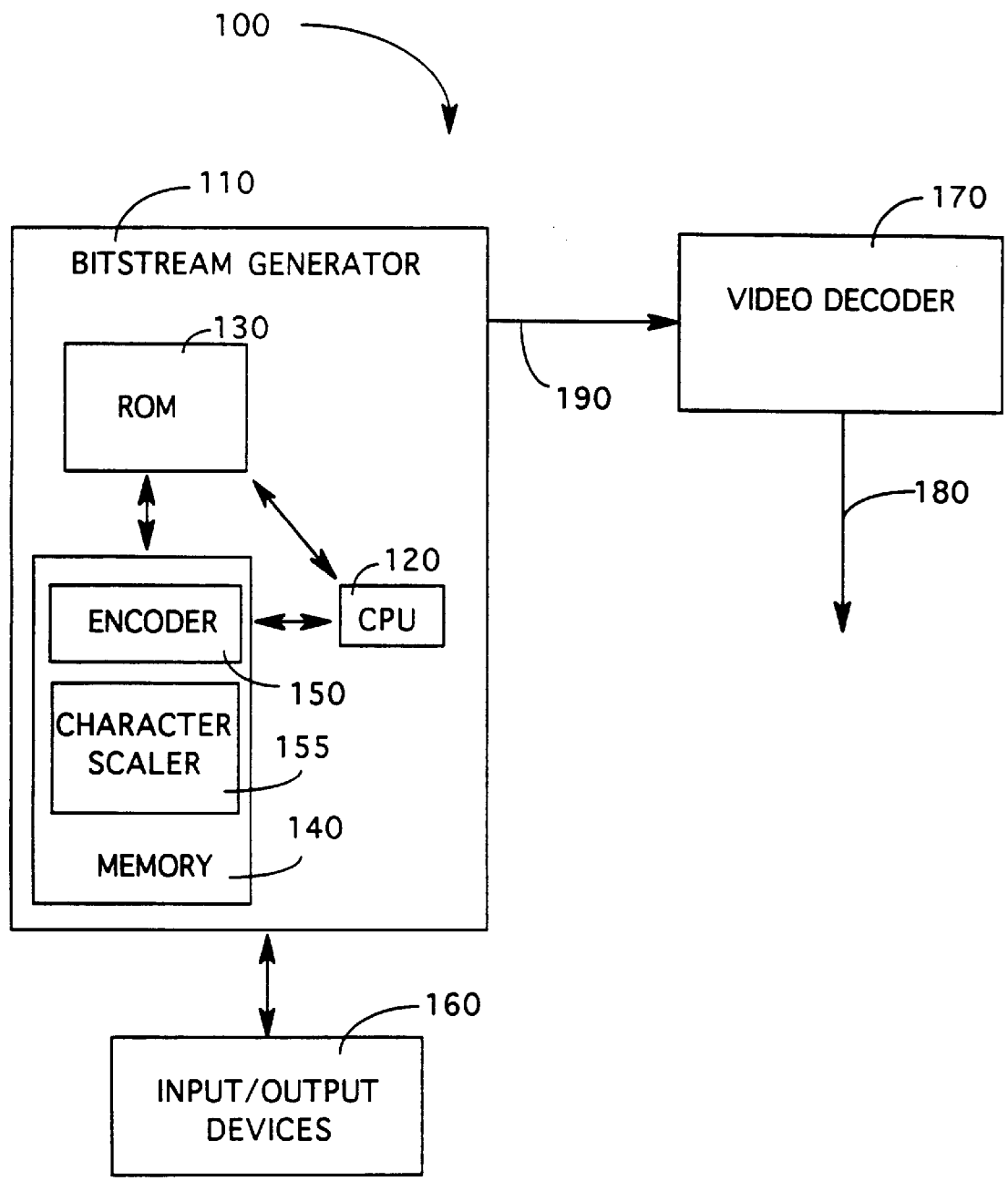
FIG. 1 is a block diagram of a codec system including a bitstream generator in accordance with an aspect of the invention.

FIG. 1 illustrates a block diagram of a coder/decoder (codec) system 100. The codec system comprises a bitstream generator 110, input/output (I/O) devices 160 and a video decoder 170.

The present invention is described below in accordance with the MPEG standards. However, those skilled in the art will realize that the present invention can be applied or adapted to other codec systems implementing other encoding/decoding formats.

In the preferred embodiment, the bitstream generator comprises a general purpose computer having a central processing unit (CPU) 120, a memory 140, a read only memory (ROM) 130, a character scaler 145 and an encoder 150 for generating a plurality of encoded video bitstreams for transmission to a video decoder 170. The encoder 150 and character scaler 155 can be implemented as separate physical devices or as algorithms recalled from the memory 130 and executed by the CPU 120.

The video decoder 170 is coupled to the bitstream generator 110 and receives a plurality of encoded bitstreams through a communication system such as a transmission channel 190. The encoded bitstreams contain the coded representation of a plurality of input images to the encoder. In turn, the video decoder decodes the encoded bitstreams to produce a plurality of decoded images 180.

The bitstream generator 110 is coupled to a plurality of input and output devices 160 such as a keyboard, a mouse, a modem, a camera, a video monitor or storage devices including but not limited to a hard disk drive or a compact disk drive. The input devices serve to provide inputs to the bitstream generator for producing the encoded video bitstreams or to retrieve the encoded video bitstreams from the ROM 130 or other storage devices (not shown).

More specifically, a set of OSD font characters is initially provided to the bitstream generator 110 as an image or is entered as a set of inputs from a keyboard in an "off-line"

process. Each character in the OSD font set is scaled into a fixed block size by character scaler 155. In the preferred embodiment, each OSD character is scaled into the size of a macroblock, i.e., a block size of 16×16 pixels in accordance with the MPEG standards. Since many parameters such as coding mode and quantization scale can be selected at the macroblock level, this scaling step provides flexibility by permitting the encoder to adjust the parameters of each macroblock, if necessary, during the encoding of a frame of OSD messages.

Once the OSD font characters are encoded, they are stored as character bitstreams in a storage medium such as a ROM 130. However, those skilled in the art will realize that the character bitstreams can be stored in other storage media such as random access memory (RAM), a hard disk drive or a compact disk drive. Each OSD character is represented individually by a character bitstream such that each can be extracted separately and cascaded to form an OSD message bitstream.

Subsequently, if a screen of OSD messages needs to be encoded into an OSD message bitstream, the OSD messages are provided to the bitstream generator as a frame of OSD messages or are entered as a set of inputs from a keyboard in an "on-line" process. The bitstream generator identifies the OSD characters within the OSD messages and retrieves the corresponding character bitstreams from the ROM to construct a MPEG-compliant OSD message bitstream.

Figure 2:
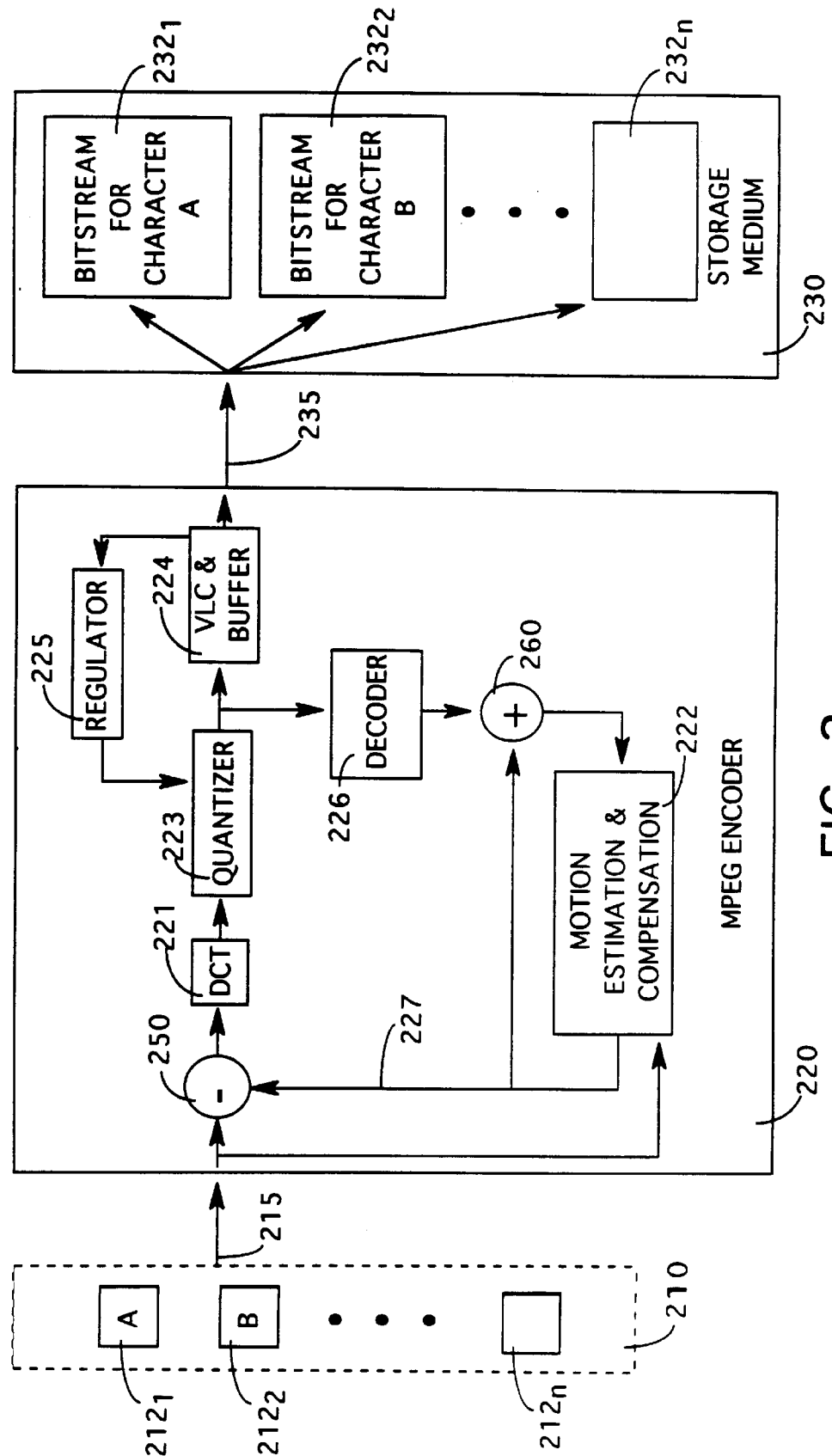
FIG. 2 is a block diagram which discloses details of the encoder for encoding a set of OSD font characters into a plurality of stored character bitstreams.

FIG. 2 depicts a block diagram of a simplified structure of a video encoder 220 for encoding a set of OSD font characters 210 into a plurality of character bitstreams $232_1$-$232_n$. The character bitstreams are stored in a storage medium 230.

Video encoder 220 is a simplified MPEG-compliant video encoder for encoding an input image on path 215 to produce a bitstream on path 235. In the preferred embodiment, the input image or picture comprises a plurality of OSD characters $212_1$-$212_n$ where each character is enclosed within a macroblock. Once the encoder has decided which picture type (I, P, or B) to use for each picture, motion estimation and compensation section 222 constructs a motion compensated prediction (predicted image) 227. This predicted image is subtracted, using subtractor 250, from the input image on path 215 in the current macroblock to form an error signal or predictive residual. The formation of the predictive residual removes redundant information in the input image by transmitting only the information necessary to generate the predictions of the image and the errors of these predictions.

To further reduce the bit rate, the predictive residual for each macroblock is then transformed by the Discrete Cosine Transform (DCT) section 221. In accordance with the MPEG standards, each macroblock comprises four (4) luminance blocks and two color difference blocks (one $C_r$ block and one $C_b$ block), where a block is defined as an eight (8) by eight (8) sample array. The DCT section 221 applies a forward discrete cosine transform process to each block of the predictive residual signal to produce an eight (8) by eight (8) block of DCT coefficients. The top left coefficient in this 8×8 block is called the "DC coefficient", while remaining coefficients are called "AC coefficients".

The resulting 8×8 block of DCT coefficients is received by quantizer 223 where the DCT coefficients are quantized. The process of quantization reduces the accuracy of the DCT coefficients by dividing the DCT coefficients by a set of quantization values with appropriate rounding to form integer values. The quantization values can be set individually for each DCT coefficient using various criteria, e.g., visually weighted quantization, frequency weighted quantization and the like.

Since OSD characters contain sharp edges and are displayed stationary, a small quantization value is selected for encoding. In the preferred embodiment, the quantization value is set at four (4). However, each OSD character can be encoded using a different quantization value in accordance with the complexity of the character. The process of quantization is a key operation and often serves as a tool to control the encoder to match its output to a given bit rate (rate control).

Next, the resulting 8×8 block of quantized DCT coefficients is received by variable length coding (VLC) and buffer section 224. The VLC and buffer section encodes the string of quantized DCT coefficients and all side-information for each macroblock such as macroblock type and motion vectors by utilizing variable length coding and run-length coding.

However, a consequence of using different picture types and variable length coding is that the overall bit rate is variable. Namely, the number of bits used to code each picture can vary from one picture to the next. In applications that involve a fixed-rate channel, the "First In-First Out" (FIFO) buffer in the VLC and buffer section is used to match the encoder output rate to the channel rate for smoothing the bit rate. Thus, the output signal of FIFO buffer is a compressed representation of the input image on path 215, where it is sent to a storage medium 230 or a telecommunication channel (not shown).

The MPEG encoder further incorporates a regulator 225 to prevent overflow and underflow conditions within the video decoder 170 (FIG. 1). More specifically, at regular intervals determined by the picture rate, the video decoder 170 shown in FIG. 1 instantaneously removes all the bits for the next picture from its input buffer (not shown). If there are too few bits or too many bits in the input buffer, an error condition may result. Thus, regulator 225 monitors the status of the buffer in the VLC and buffer section 224 to control the number of bits generated by the encoder, thereby preventing the overflow and underflow conditions within the video decoder. One method for controlling the number of bits generated by the encoder is to alter the quantization value, i.e., increase the quantization value to decrease the number of bits and vice versa.

Finally, the resulting 8×8 block of quantized DCT coefficients is dequantized and transformed by the decoder 226 which is also known as an "embedded decoder". The decoder 226 serves to reverse the processes of quantization and DCT to produce the decoded error signal. This error signal is then added back, using adder 260, to the prediction signal from the motion estimation and compensation section 222 to produce a decoded reference picture. Generally, if an I-frame or a P-frame is decoded, it will be stored within section 222, replacing the oldest stored reference picture.

Although the present invention is described with reference to a standard MPEG-compliant video encoder, a simplified encoder can be used to further simplify and accelerate the method of encoding OSD characters. To illustrate, the motion estimation and compensation section 222, decoder 226 and regulator 225 can be eliminated. In encoding OSD characters, each macroblock is encoded in accordance with the intra macroblock coding syntax. As such, there is no need to perform motion estimation and compensation which, in turn, eliminates the need to incorporate a decoder 226 to produce a decoded reference picture.

Finally, since the OSD characters are intra encoded in advance, the size of each character bitstreams is known prior to constructing an OSD message bitstream. As such, the total number of bits of an OSD message bitstream can be determined before the bitstream is constructed, thereby eliminating the need to incorporate a regulator 225. The repetitive nature of OSD messages permits the bitstream generator to incorporate an efficient and simplified encoder for encoding OSD messages to produce MPEG-compliant OSD message bitstreams.

Figure 3:
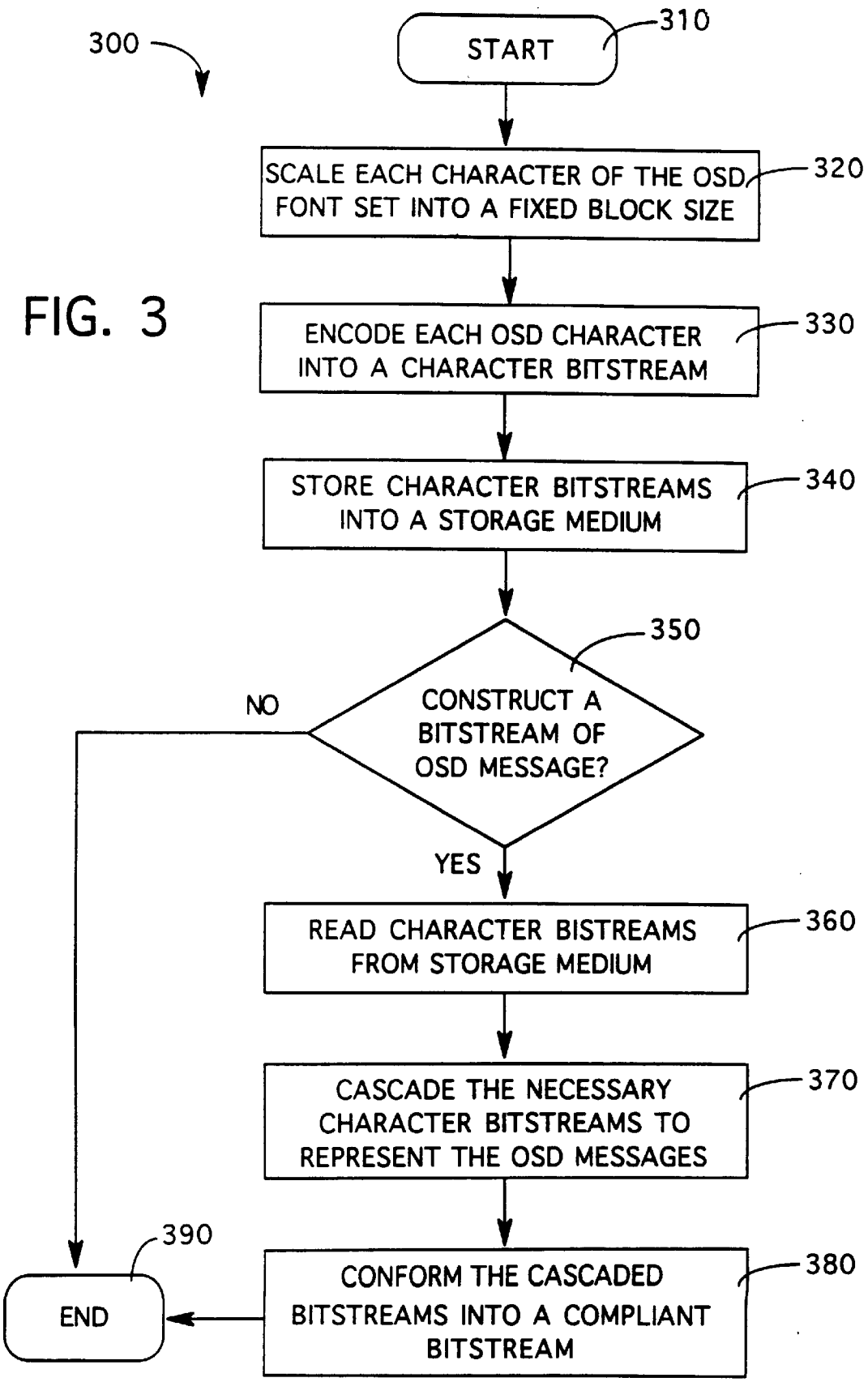
FIG. 3 is a flowchart illustrating the method for constructing a valid OSD message bitstream from a plurality of stored character bitstreams.

FIG. 3 illustrates a method 300 for constructing a valid OSD message bitstream from a plurality of stored character bitstreams. Method 300 encodes the OSD characters into a plurality of character bitstreams which are selectively read from a storage medium to construct a MPEG-compliant OSD message bitstream.

Referring to FIG. 3, the method 300 begins at step 310 and proceeds to step 320 where each character of the OSD font set is scaled into a fixed block size. The preferred block size is a standard macroblock having a size of 16×16 pixels.

In step 330, each character of the OSD font set is encoded into a character bitstream. Since the OSD characters often contain sharp edges, method 300 encodes each character accurately using the intra macroblock coding mode with a relatively small quantization value, e.g., four (4). This value permits the OSD messages to be displayed without noticeable distortion after decoding by the video decoder. However, the OSD characters can be encoded using different quantization values depending on the complexity of each character or to simply provide each character bitstream in varying sizes. This flexibility permits the bitstream generator to construct an OSD message bitstream that complies with a prescribed bit rate.

In step 340, the character bitstreams are stored in a storage medium such as a ROM or a disk. Since the OSD characters remain the same, the stored character bitstreams are selectively retrieved to construct an OSD message bitstream.

In step 350, method 300 determines whether an OSD message bitstream needs to be constructed. If the query is negatively answered, method 300 proceeds to step 390 where the method ends. Steps 320–340 can be implemented as an "off-line" process where the character bitstreams are generated and stored for later use. If the query at step 350 is affirmatively answered, method 300 proceeds to step 360 where the character bitstreams are read from the storage medium.

In step 360, method 300 identifies the characters of an OSD message and selectively retrieves the corresponding character bitstreams from the storage medium. Method 300 can identify the characters of an OSD message from an input image or as a set of inputs from a keyboard to the bitstream generator.

In step 370, method 300 cascades the retrieved character bitstreams into a MPEG-compliant OSD message bitstream that represents the OSD message. Furthermore, a "slice start code" is inserted before each character bitstream to indicate the start of a slice. A slice consists of an integral number of macroblocks in raster scan order. The minimum size of a slice in a picture is one macroblock. Since the DC coefficient is correlated with the DC coefficient of the preceding block, a slice start code is applied between each macroblock to sever this correlation. Since there is no correlation when each OSD character is encoded into a separate character bitstream, the slice start code prevents the video decoder from incorrectly applying any correlation in decoding the DC coefficients of the OSD message bitstream. Namely, each OSD character is initially encoded into a character bitstream without any correlation. However, since the OSD message bitstream can be decoded by any MPEG-compliant decoders, the slice start codes are used to prevent the decoders from applying correlation to the DC coefficient when no correlation was applied in the encoding process.

In step 380, method 300 conforms the cascaded bitstreams into a MPEG-compliant bitstream. Since the OSD message bitstream is constructed from a plurality of intra coded macroblocks and all the coding parameters are known in advance, method 300 inserts other MPEG specific information into the OSD message bitstream for conforming the bitstream to the MPEG standards. The MPEG-specific information includes a sequence header, group of picture header, picture header, various extensions and a sequence end which can all be generated in advance.

However, the parameter "vbv delay" needs to be changed depending on the specific OSD message. The MPEG standards specify an abstract model of the buffering system, the Video Buffer Verifier (VBV) in order to constrain the maximum variability in the number of bits that are used for a given picture. The VBV is a hypothetical decoder which is initially empty and is conceptually connected to the output of the encoder. The VBV has an input buffer known as VBV buffer which is filled from the encoded bitstream for the time specified by the parameter or field "vbv_delay" in the video bitstream. This ensures that an encoded bitstream can be decoded with a buffer of known size. Since the size of each character bitstream is known, the vbv_delay can be easily calculated from the OSD message bitstream, e.g., by adding the number of bits used to encoded each character and the relevant overhead bits. Once the necessary MPEG-specific information is added to the OSD message bitstream, method 300 ends in step 390.

We claim:

1. A method of constructing character bitstreams (232). encoded using a block code having a block size, for an on-screen display message bitstream representing an on-screen display message, comprising the step of:

storing (340) a set of encoded character bitstreams (232) into a storage medium (130); characterized by the steps of:

scaling (320) each character of an on-screen display font set into a fixed block size, corresponding to the code block size to produce a set (212) of scaled on-screen display characters; and block encoding (330) each of said scaled on-screen display characters (212) into a corresponding one of the set of encoded character bitstreams (232).

2. The method of claim 1, further characterized by the steps of:

reading (360) a plurality of said set (232) of encoded character bitstreams, respectively corresponding to characters comprised in the onscreen display message, from said storage medium (130); and cascading (370) said plurality of encoded character bitstreams (232) into the on-screen display message bitstream.

3. The method of claim 2, characterized by the step of inserting (370) a block separator code into said on-screen display message bitstream before each of said plurality of character bitstreams (232).

4. The method of claim 3, characterized in that the block code is an MPEG-compliant block code, and the block separator code is an MPEG slice start code in accordance with the MPEG standards.

5. The method of claim 1, characterized in that said on-screen display message bitstream is NIPEG-compliant.

6. The method of claim 5, characterized in that the block code is an MPEG-compliant block code, and said fixed block size is an MPEG macroblock.

7. The method of claim 1, characterized in that said storage medium (130) is a read only memory (ROM) (130).

8. An on-screen display message bitstream encoded using a block code having a block size, characterized by:

a plurality of block encoded character bitstreams (232) respectively corresponding to on-screen display characters scaled to the code block size and block encoded (212); and a plurality of block separator codes, wherein each of said plurality of encoded character bitstreams (232) is preceded by one of said plurality of block separator codes.

9. The bitstream of claim 8, characterized in that said block code is MPEG compliant, and said block separator codes are MPEG slice start codes in accordance with the MPEG standards.

10. An apparatus for generating character bitstreams, encoded using a block code having a block size, for an on-screen display message bitstream representing an on-screen display message, characterized by:

a storage medium (130);

a block encoder (150;220), coupled to said storage medium (130;230), for encoding a plurality of on-screen display characters into a corresponding plurality of encoded character bitstreams (232), wherein said plurality of encoded character bitstreams (232) are stored in said storage medium (180); and a character scaler (155), coupled to said encoder (150;220), for scaling each of said plurality of on-screen display characters into a fixed block size (212), corresponding to the code block size, before said onscreen display characters (212) are encoded.

11. The apparatus of claim 10, further characterized by a central processing unit (CPU) (120), coupled to said storage medium (180), for selectively retrieving ones of said plurality of encoded character bitstreams (232) corresponding to display characters comprised in the onscreen display message, from said storage medium (180), wherein said CPU (120) cascades said retrieved encoded character bitstreams (232) to form the on-screen display message bitstream.

12. The apparatus of claim 11, further characterized by a memory (140), coupled to said CPU (120), wherein said encoder (150) is implemented as an algorithm stored within said memory (140) and executed by said CPU (120).

13. The apparatus of claim 11 further characterized by a memory (140), coupled to said CPU (120), wherein said character scaler (155) is implemented as an algorithm stored within said memory (140) and executed by said CPU (120).

14. The apparatus of claim 10, characterized in that said storage medium (130) is a read only memory (ROM).

15. The apparatus of claim 10, characterized in that said encoder (150;220) is a MPEG compliant encoder.

16. The apparatus of claim 15 characterized in that said fixed block size is the size of an MPEG macroblock.

* * * * *